(12) United States Patent
Kole

(10) Patent No.: US 12,741,338 B2
(45) Date of Patent: Sep. 22, 2026

(54) SCANNING RADIAL LASER PROCESSING WITH BI-CONICAL REFLECTION

(71) Applicant: Rofin-Sinar Technologies LLC, Plymouth, MI (US)

(72) Inventor: Matthew R. Kole, Troy, MI (US)

(73) Assignee: Rofin-Sinar Technologies LLC, Plymouth, MI (US)

( * ) Notice: Subject to any disclaimer, the term of this patent is extended or adjusted under 35 U.S.C. 154(b) by 863 days.

(21) Appl. No.: 17/963,057

(22) Filed: Oct. 10, 2022

(65) Prior Publication Data

US 2023/0118887 A1 Apr. 20, 2023

Related U.S. Application Data

(60) Provisional application No. 63/257,887, filed on Oct. 20, 2021.

(51) Int. Cl.

| | |
|---|---|
| ***B23K 26/082*** | (2014.01) |
| ***B23K 26/064*** | (2014.01) |
| ***B23K 26/28*** | (2014.01) |

(52) U.S. Cl.

CPC ........ *B23K 26/082* (2015.10); *B23K 26/0643* (2013.01); *B23K 26/28* (2013.01)

(58) Field of Classification Search

CPC . B23K 26/082; B23K 26/083; B23K 26/0643

See application file for complete search history.

(56) References Cited

U.S. PATENT DOCUMENTS 4,456,811 A * 6/1984 Hella ................. B23K 26/0734 148/903
4,623,776 A * 11/1986 Buchroeder ....... B23K 26/0648 359/618

(Continued)

FOREIGN PATENT DOCUMENTS

DE 102005000631 A1 7/2006
EP 0087403 A1 8/1983

(Continued)

OTHER PUBLICATIONS

International Search Report and Written Opinion received for International Patent Application No. PCT/US2022/077891 mailed on Feb. 2, 2023, 14 pages.

*Primary Examiner* — Woody A Lee, Jr.
(74) *Attorney, Agent, or Firm* — TraskBritt

(57) ABSTRACT

An apparatus for radial laser processing of a workpiece, located on a center axis, includes a laser beam scanner directing a laser beam along but offset from the center axis, and a bi-conical reflector system including first and second conical mirror surfaces surrounding the center axis. The first conical mirror surface faces away from the center axis to reflect the laser beam radially outwards therefrom, toward the second conical mirror surface. The second conical mirror surface faces the center axis to reflect the laser beam radially inwards toward the workpiece. The laser beam scanner azimuthally scans a location of incidence of the laser beam on the first conical mirror surface to scan an azimuthal angle of propagation of the laser beam from the second conical mirror surface toward the workpiece. The apparatus enables irradiation of the entire circumference of the workpiece without physically rotating the workpiece.

11 Claims, 9 Drawing Sheets

(56) References Cited

U.S. PATENT DOCUMENTS

| | | | | |
|---|---|---|---|---|
| 6,696,667 | B1 * | 2/2004 | Flanagan | B23K 26/0823 219/121.72 |
| 8,546,725 | B2 | 10/2013 | Ramsayer | |
| 9,429,716 | B1 | 8/2016 | Elkins, II et al. | |
| 2008/0290077 | A1 * | 11/2008 | DeMeritt | C03B 33/091 219/121.72 |
| 2011/0253245 | A1 | 10/2011 | Boltshauser | |
| 2016/0070064 | A1 * | 3/2016 | Klimowych | B23K 26/0643 392/419 |
| 2021/0060861 | A1 | 3/2021 | Ream et al. | |

FOREIGN PATENT DOCUMENTS

| | | | |
|---|---|---|---|
| EP | 1518664 | A1 | 3/2005 |
| EP | 2168709 | B1 | 2/2017 |
| WO | WO-2012119731 | A1 | 9/2012 |

* cited by examiner

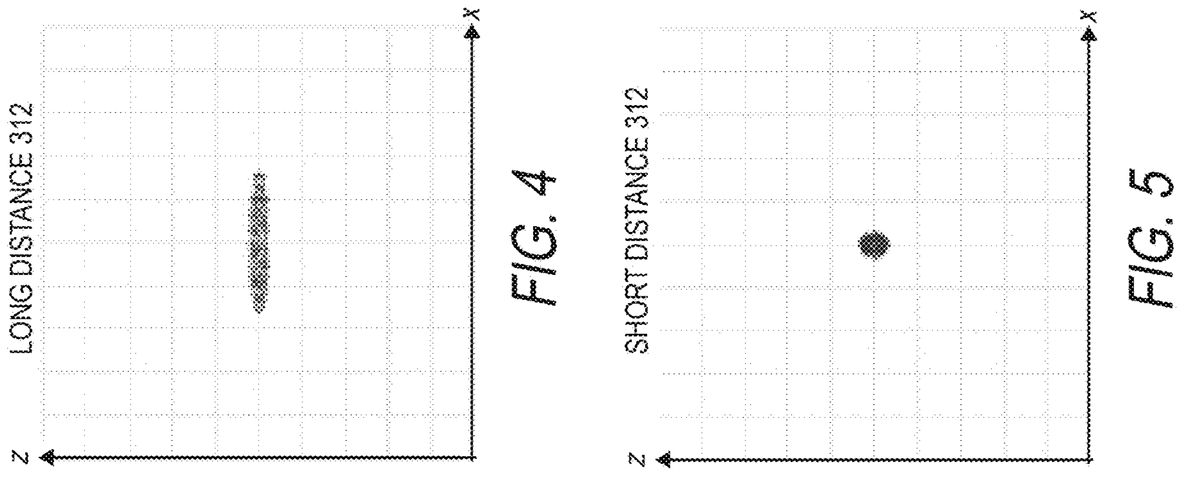
FIG. 4
FIG. 5
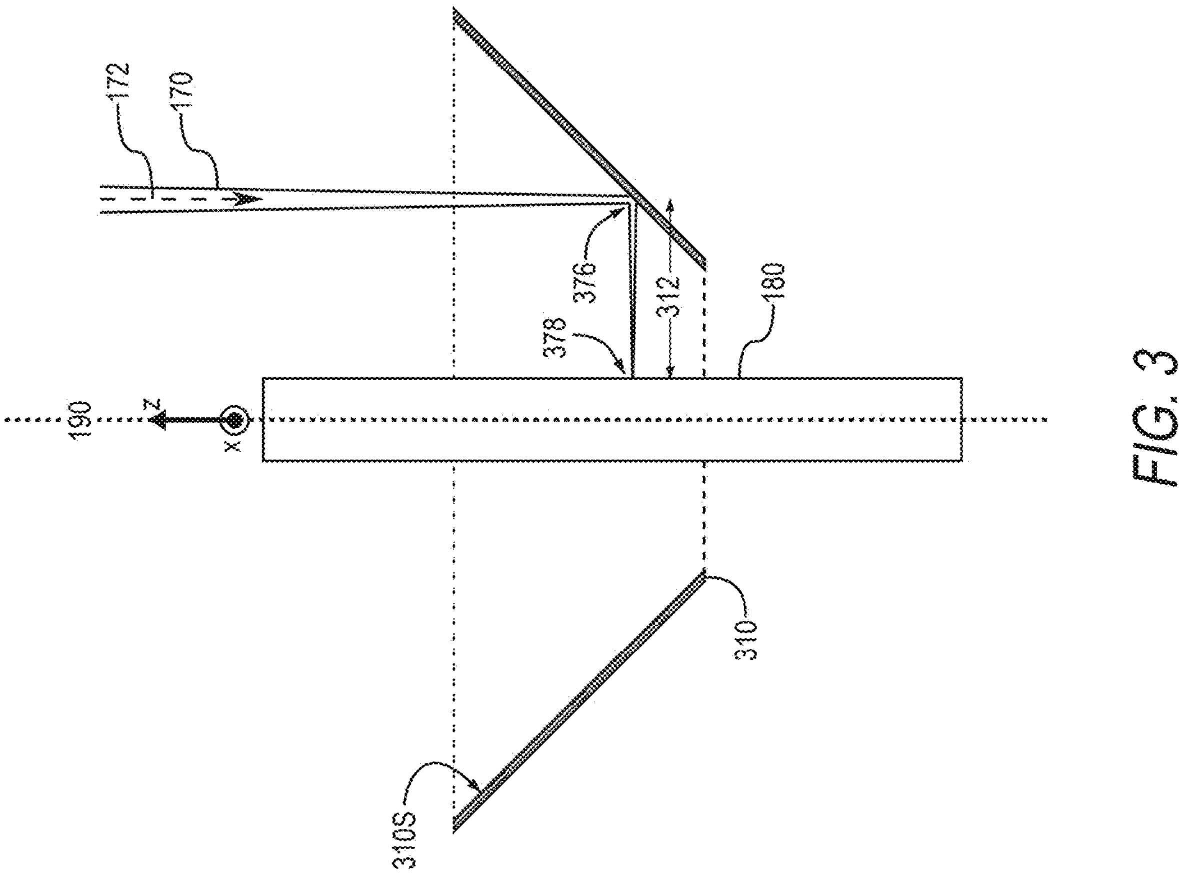
FIG. 3

1010
1012
1012S
1014
1014S
170(1)
170(2)
170(3)
1076(1)
1076(2)
1076(3)
1080
190
240
242

RADIAL DISTANCE $d_1$

RADIAL DISTANCE $d_2$

RADIAL DISTANCE $d_3$

SCANNING RADIAL LASER PROCESSING WITH BI-CONICAL REFLECTION

CROSS REFERENCE TO THE RELATED APPLICATIONS

This application claims priority to U.S. Provisional Patent Application Ser. No. 63/257,887, filed Oct. 20, 2021, the disclosure of each of which is hereby incorporated herein in its entirety by this reference.

TECHNICAL FIELD

The present disclosure relates in general to laser processes such as laser machining, cutting, marking, and welding. The present disclosure relates, in particular, to laser processing of rod-shaped workpieces.

BACKGROUND

Beams of laser-radiation are increasingly used to machine, weld, or otherwise work a wide range of materials, including metals, plastics, and glass. The laser processes include cutting, scribing, drilling, marking, welding, heat treating, and annealing. Conventional mechanical machining as well as conventional welding tend to produce unwanted defects such as micro-cracks that may propagate when a processed workpiece is stressed, thereby degrading and weakening the processed workpiece. Laser processing minimizes such unwanted defects, is generally cleaner, and may be performed with greater accuracy. Laser machining uses a focused laser beam to produce precise cuts and holes, having high quality edges and walls, while minimizing the formation of unwanted defects. In laser welding, a focused laser beam locates each weld spot or seam precisely, while minimizing collateral heating. In laser marking, a focused laser beam removes or oxidizes material to form a permanent visible mark with greater accuracy and speed than conventional mechanical technology.

A typical laser processing apparatus includes a laser head that emits a converging laser beam, and automated tooling that positions workpieces at the laser beam waist. Most laser processing tasks require irradiating more than just a single spot on the workpiece. For example, the task may involve tracing a path on the workpiece and/or irradiating several separate regions of the workpiece. Many laser heads have scanning functionality to optically steer the laser beam to different locations on a workpiece. Alternatively, or in combination therewith, the workpiece and laser head may be mechanically moved relative to each other using robotic tooling or motorized stages. The preferred approach to changing the positional relationship between the workpiece and the laser beam depends on the geometry of the workpiece and laser processing task to be performed.

A common optical design for scanning laser heads is based on one or more galvanometer-actuated mirrors ("galvo mirrors") and a focusing objective. When two-dimensional (2D) scanning is required, two galvo mirrors with orthogonal sweep angles are arranged in series. The galvo mirror(s) may be placed before or after the focusing objective. In the case of scanning laser heads with the galvo mirror(s) placed after the focusing objective, the scan field is curved. When scanning the propagation angle of the converging laser beam with the galvo mirror(s), the laser beam focus follows an approximately spherical surface. In scanning laser heads with the galvo mirror(s) placed before the focusing objective, the focusing objective may be designed to achieve a planar scan field. In such flat-field scanning laser heads, the focusing objective may further be telecentric such that (a) the scan field is planar and (b) the laser beam propagation direction toward the workpiece is parallel to the optical axis of the focusing objective regardless of the scan angle(s) of the galvo mirror(s). With this configuration, the laser beam parameters at the planar scan field are unaffected by scanning. This configuration is widely used for 2D scanning laser processing of planar workpieces.

One class of laser processing tasks and associated technologies is concerned with processing of rod-shaped workpieces. Rod-shaped workpieces, as opposed to flat workpieces, present the challenge of irradiating the workpiece from many different angles to expose different sides of the workpiece. However, rod-shaped workpieces also lend themselves naturally to rotation. Thus, following the tradition from mechanical machining, the problem is usually solved by rotating the rod-shaped workpiece about its longitudinal axis. For example, the rod-shaped workpiece may be held by a chuck that rotates the workpiece.

BRIEF SUMMARY

Disclosed herein are an apparatus and a method for scanning radial laser processing of a workpiece using bi-conical reflection of the laser beam to access the workpiece around its circumference. The present technique is suitable for laser processing of rod-shaped workpieces and allows for laser processing of the full circumference of the workpiece by laser beam scanning and without rotating the workpiece. This technique is motivated, in part, by the realization that conventional laser processing of rod-shaped workpieces is limited by the speed of the physical workpiece rotation and that higher processing speeds are achievable when the physical workpiece rotation is replaced with laser beam scanning. In addition, certain laser processing tasks are difficult to perform with high quality when relying on physical rotation of the workpiece. For example, when attempting to weld together two rods using physical workpiece rotation in a stationary laser beam, maintaining robust contact and alignment between the two rods during rotation has proven challenging, especially for small-diameter workpieces such as those used in the medical device industry.

The present apparatus utilizes a bi-conical reflector system to radially irradiate a workpiece located on a center axis. The apparatus is optimized to process a rod-shaped workpiece with its symmetry axis coinciding with a center axis of the apparatus. The bi-conical reflector system surrounds the center axis and includes two conical mirror surfaces that are rotationally symmetric about the center axis. When a laser beam is incident on the bi-conical reflector system along a propagation path along but offset from the center axis, a first conical mirror surface reflects the laser beam radially outward to a second conical mirror surface that then reflects the laser beam radially inward toward the workpiece. The laser beam is directed toward the bi-conical reflector system by a laser beam scanner configured to azimuthally scan the incidence location of the laser beam on the first conical mirror surface so as to azimuthally scan the radial propagation direction along which the laser beam is incident on the workpiece.

The apparatus is capable of irradiating the workpiece around its entire circumference without physically rotating the workpiece. As a result, the apparatus can process workpieces at a greater rate than conventional systems that rely on physical workpiece rotation. Additionally, as pertaining to the particular task of welding together rod-shaped parts, the present approach eliminates the need to physically rotate the rod-shaped parts during welding and instead benefits from a fixed orientation of the rod-shaped parts to maintain robust contact and alignment therebetween.

While it would be possible to omit the first conical mirror surface and azimuthally scan the radial propagation direction of the laser beam onto the workpiece using only the second conical mirror surface, the laser beam parameters at the workpiece are greatly improved when using both conical mirror surfaces.

In one aspect, an apparatus for radial laser processing of a workpiece, located on a center axis, includes a laser beam scanner for directing a laser beam along but offset from the center axis, and a bi-conical reflector system including a first conical mirror surface and a second conical mirror surface. The first conical mirror surface is arranged to receive the laser beam from the laser beam scanner. The first conical mirror surface surrounds the center axis, is non-cylindrical and rotationally symmetric about the center axis, and faces away from the center axis to reflect the laser beam radially outwards therefrom. The second conical mirror surface is arranged to receive the laser beam from the first conical mirror surface. The second conical mirror surface surrounds the center axis, is rotationally symmetric about the center axis, and faces the center axis so as to reflect the laser beam radially inwards toward the center axis. The laser beam scanner is configured to azimuthally, with respect to the center axis, scan a location of incidence of the laser beam on the first conical mirror surface to scan an azimuthal angle of propagation of the laser beam from the second conical mirror surface toward the center axis.

In another aspect, a method for radial laser processing of a workpiece includes a step of directing a laser beam along, but offset from, a center axis onto a first conical mirror surface that faces away from the center axis, such that the first conical mirror surface reflects the laser beam radially outwards and onto a second conical mirror surface that faces the center axis, such that the second conical mirror surface reflects the laser beam radially inwards onto the workpiece disposed on the center axis. Each of the first and second conical mirror surfaces surrounds and is rotationally symmetric about the center axis. The method further includes, while performing the directing step, a step of azimuthally scanning, with respect to the center axis, a location of incidence of the laser beam on the first conical mirror surface so as to scan workpiece-irradiation by the laser beam around a circumference of the workpiece.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description of the preferred embodiments given below, serve to explain principles of the present disclosure.

FIG. 3 illustrates an alternative to the bi-conical reflector system of the apparatus of FIGS. 1 and 2 having only a single, radially inward-facing conical reflector.

FIGS. 4 and 5 are spot diagrams of a laser beam at a workpiece, processed with the single radially inward-facing conical reflector of FIG. 3, for two respective distances from the location of incidence of the laser beam on the radially inward-facing conical reflector to the workpiece.

DETAILED DESCRIPTION

Figure 1:
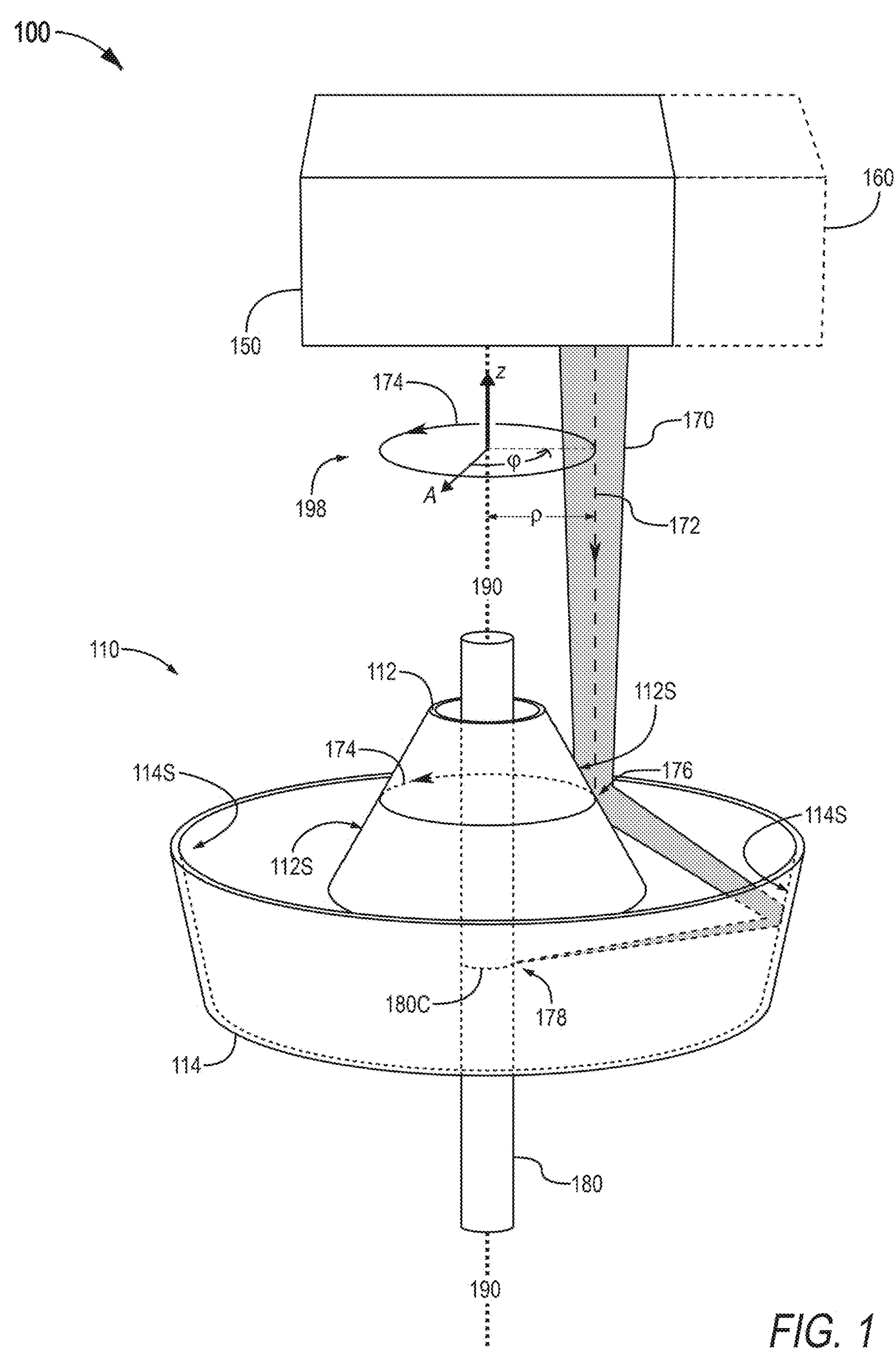
FIGS. 1 and 2 illustrate an apparatus for scanning radial laser processing of a workpiece, located on a center axis, utilizing a laser beam scanner and a bi-conical reflector system to direct the laser beam to the workpiece and azimuthally scan the direction from which the laser beam is incident on the workpiece, according to an embodiment. The bi-conical reflector system includes a radially outward-facing conical mirror surface and a radially inward-facing conical mirror surface.
Figure 2:
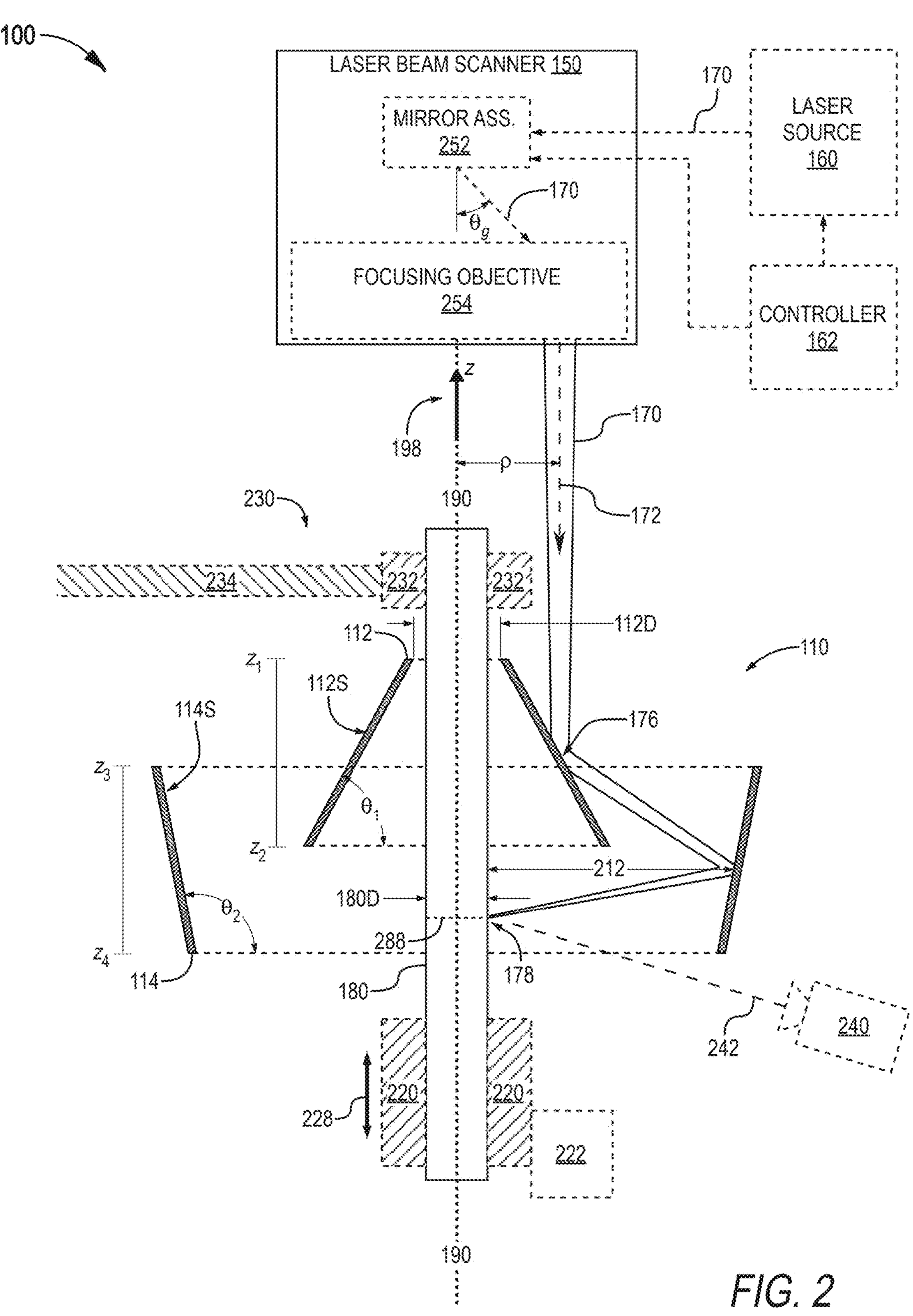

Referring now to the drawings, wherein like components are designated by like numerals, FIGS. 1 and 2 illustrate one apparatus 100 for scanning radial laser processing of a workpiece 180 located on a center axis 190. FIG. 1 is a perspective view of apparatus 100, and FIG. 2 is a cross-sectional sideview of apparatus 100. The design of apparatus 100 is optimized for processing of rod-shaped workpieces positioned in apparatus 100 with their longitudinal axis coinciding with center axis 190, wherein the cross-section of the workpieces orthogonal to center axis 190 is circular. A circular cross section corresponds to the workpiece being rotationally symmetric about center axis 190. Thus, in a primary use scenario, at least a portion of workpiece 180 is rod-shaped (hollow or solid) and rotationally symmetric about center axis 190, and apparatus 100 irradiates the rotationally symmetric portion of workpiece 180 with a laser beam 170. However, portions of workpiece 180 not processed by laser beam 170 may have a different shape. Apparatus 100 may also process portions of workpiece 180 that are not rotationally symmetric, for example portions with a polygonal cross section, although such processing may require more complex operation of apparatus 100. Hereinafter, the operation of apparatus 100 is discussed in the context of rotationally symmetric, rod-shaped workpieces unless otherwise mentioned.

Apparatus 100 may be configured and operated to perform a variety of laser processing tasks, including welding, marking, cutting, and otherwise machining or treating workpiece 180. As such, apparatus 100 is capable of, for example, welding together two rod-shaped sections, cutting holes in a tube, and generating markings on a rod-shaped object. Apparatus 100 may be used in device manufacturing in a wide range of different technology sectors. For example, apparatus 100 may be used in the medical device industry to weld metal cannulas and needles, cut stents, and mark tubular medical devices with, e.g., graduations or barcodes. In another example, apparatus 100 is used to laser clean rod-shaped components for vacuum and aerospace applications.

Apparatus 100 includes a laser beam scanner 150 and a bi-conical reflector system 110. Bi-conical reflector system 110 includes two reflectors 112 and 114 having respective conical mirror surfaces 112S and 114S. Each of surfaces 112S and 114S surrounds and is rotationally symmetric about center axis 190. Surface 112S faces away from center axis 190, and surface 114S faces center axis 190. Scanner 150 directs laser beam 170 toward surface 112S along a propagation path 172 that is along center axis 190 but displaced from center axis 190 by an offset p. Propagation path 172 may be parallel to center axis 190 or at an angle to center axis 190. There are certain advantages to implementations of apparatus 100 wherein scanner 150 is configured to deliver laser beam 170 on a propagation path 172 that is parallel or nearly parallel to center axis 190, for example within 5 degrees of being parallel to center axis 190. Surface 112S reflects laser beam 170 radially outward to surface 114S. Surface 114S then reflects laser beam 170 radially inward toward center axis 190 to irradiate workpiece 180.

Herein, as pertaining to laser beam propagation paths, the term axial refers to a path that is parallel to center axis 190, and the term radial refers to a path that, at least when extrapolated, intersects center axis 190 orthogonally. The propagation path of laser beam 170 has a radial component both from surface 112S to surface 114S and from surface 114S to workpiece 180. Along at least one of these two segments, the propagation path of laser beam 170 has an axial component as well. The propagation path of laser beam 170 from scanner 150 to workpiece 180 is in a plane containing center axis 190, except for possible minor deviations caused by, e.g., manufacturing tolerances and alignment imperfections.

FIG. 1 shows a cylindrical coordinate system 198 having a longitudinal axis z and a polar axis A. Longitudinal axis z is oriented opposite the propagation direction of laser beam 170 along propagation path 172, such that laser beam 170 propagates in the negative z-axis direction from scanner 150 to surface 112S. Polar axis A points radially away from center axis 190.

Scanner 150 scans propagation path 172 azimuthally with respect to center axis 190. In reference to cylindrical coordinate system 198, scanner 150 scans the location of propagation path 172 in the azimuthal dimension indicated by azimuthal angle q. This scanning results in the location of incidence (LOI) 176 of laser beam 170 on surface 112S being scanned azimuthally along a circular path 174, and the location of incidence (LOI) 178 of laser beam 170 on workpiece 180 being scanned azimuthally along its circumference 180C. Apparatus 100 is thereby capable of irradiating workpiece 180 around its entire circumference 180C without physically rotating workpiece 180, and also without moving reflectors 112 and 114.

Certain embodiments of apparatus 100 include a laser source 160, and a controller 162 (shown in FIG. 2) that controls the operation of scanner 150 and laser source 160. Embodiments of apparatus 100 that omit one or both of laser source 160 and controller 162 are configured to be coupled to a separately obtained laser source 160 and/or controller 162. Laser source 160 generates laser beam 170 and delivers laser beam 170 to scanner 150, for example via an optical fiber. Controller 162 operates scanner 150 to change the azimuthal location of propagation path 172 as needed to perform a certain scanning task. Optionally, controller 162 operates scanner 150 to change the radial offset p. Controller 162 may also turn on and off laser beam 170 and, optionally, adjust the power or other properties of laser beam 170, such as a laser pulse repetition rate in implementations where laser beam 170 is pulsed.

Apparatus 100 may irradiate workpiece 180 continuously while propagation path 172 is scanned azimuthally, so as to continuously irradiate workpiece 180 around its circumference. Alternatively, apparatus 100 may irradiate workpiece 180 at separate discrete locations along its circumference. For example, controller 162 may (a) command scanner 150 to sweep the azimuthal location of propagation path 172 while (b) turning laser beam 170 on and off to only irradiate workpiece 180 at select locations around its circumference.

Many laser processing tasks require focusing the laser beam on the workpiece in order to achieve the necessary intensity and/or spatial accuracy. Therefore, scanner 150 may be configured to focus laser beam 170 on workpiece 180.

One embodiment of scanner 150, shown schematically in FIG. 2, includes a mirror assembly 252 and a focusing objective 254. Mirror assembly 252 receives laser beam 170 from laser source 160 and steers laser beam 170 away from center axis 190 by a polar angle $\theta_g$. Mirror assembly 252 is configured to scan the azimuthal angle φ (see FIG. 1) of laser beam 170 as effected by controller 162, and may also be capable of adjusting polar angle $\theta_g$ according to signals from controller 162. One implementation of mirror assembly 252 includes two galvo mirrors. Focusing objective 254 receives laser beam 170 from mirror assembly 252 and focuses laser beam 170 to form a waist therein a distance away from focusing objective 254. The optical axis of focusing objective 254 coincides with center axis 190. Laser beam 170 may be collimated prior to focusing objective 254. Focusing objective 254 further converts polar angle $\theta_g$ to a corresponding offset p with a one-to-one correspondence therebetween. Focusing objective 254 may be at least approximately telecentric such that propagation path 172 is at least approximately parallel to center axis 190, e.g., within 5 degrees thereof, regardless of the magnitude of polar angle $\theta_g$.

As will be discussed in further detail below in reference to FIG. 7, adjustment of offset p may be utilized to focus laser beam 170 on workpieces 180 of different diameters 180D. Telecentricity of focusing objective 254 offers the most uniform performance of bi-conical reflector system 110 across a range of offsets p. On the other hand, in embodiments of apparatus 100 intended only for processing of workpieces 180 of a single diameter 180D, scanner 150 may deliver laser beam 170 at a larger polar angle $\theta_g$, for example as large as 35 degrees. Accordingly, scanner 150 may be configured differently from the example illustrated in FIG. 2. For example, focusing objective 254 may be positioned before mirror assembly 252. However, due to the significant advantage of telecentricity, hereinafter it is assumed that propagation path 172 is parallel to center axis 190 unless otherwise mentioned. The deviations from parallelism discussed above will have predictable effects on the operation and performance of apparatus 100 discussed below. When deviations from parallelism are minor, e.g., within 5 degrees, these predictable effects are minor.

The convergence of laser beam 170, as it propagates from scanner 150 toward workpiece 180, is affected by bi-conical reflector system 110. Due to their conical shapes, surfaces 112S and 114S affect the convergence of laser beam 170 in one transverse dimension only. In the view provided in FIG. 2, the affected transverse dimension is the one orthogonal to the plane of FIG. 2. Expressed more generally, the transverse dimension affected by surfaces 112S and 114S is the one that is orthogonal to the plane containing the propagation path of laser beam 170 between scanner 150 and workpiece 180. This transverse dimension is hereinafter referred to as the out-of-plane transverse dimension. The convergence of laser beam 170 in the orthogonal in-plane transverse dimension is unaffected by bi-conical reflector system 110. The out-of-plane transverse dimension of laser beam 170 is first defocused by surface 112S facing radially outward and then focused by surface 114S facing radially inward. Radial dimensions of surfaces 112S and 114S, and their angles relative to center axis 190, may be selected such that the in-plane and out-of-plane transverse dimensions of laser beam 170 come to a focus at the same total propagation distance from scanner 150. This is preferred for many laser processing applications, since co-localized focusing of the in-plane and out-of-plane transverse dimensions provides the smallest spot size at workpiece 180, and thus the greatest laser intensity and optimal accuracy. In scenarios where co-localized focusing of the in-plane and out-of-plane transverse dimensions is required, it may not be possible for the out-of-plane focusing by surface 114S to exactly compensate for the out-of-plane defocusing by surface 112S. However, at least partial compensation is achievable.

FIG. 3 is a cross-sectional sideview of a less advantageous alternative to bi-conical reflector system 110 having only a single, radially inward-facing conical reflector 310. FIG. 3 shows reflector 310 as implemented in apparatus 100 in place of bi-conical reflector system 110. Reflector 310 has a conical mirror surface 310S that surrounds center axis 190, is rotationally symmetric about center axis 190, and faces center axis 190. Surface 310S intersects propagation path 172 of laser beam 170 and reflects laser beam 170 radially inward to irradiate workpiece 180. When scanner 150 scans the azimuthal location of propagation path 172, the location of incidence (LOI) 378 of laser beam 170 on workpiece 180 is scanned around the circumference of workpiece 180. Thus, the single conical reflector 310 facilitates irradiation of the entire circumference of workpiece 180 without physically rotating workpiece 180 and also without moving reflector 310. However, surface 310S focuses the out-of-plane transverse dimension of laser beam 170, and there is no element to provide a compensating defocusing.

FIGS. 4 and 5 are spot diagrams of laser beam 170 at workpiece 180 for two respective distances 312 between LOI 378 and the location of incidence 376 of laser beam 170 on surface 310S. Each spot diagram pertains to a situation where laser beam 170 is incident on workpiece 180 at a 90-degree angle to center axis 190 (the z-axis). Each spot diagram shows the transverse profile of laser beam 170 in an xz-plane, with the x-axis being orthogonal to the plane of FIG. 3. The x-dimension represents the out-of-plane transverse dimension of laser beam 170. The FIG. 4 spot diagram is for a relatively long distance 312, and the FIG. 5 spot diagram is for a relatively short distance 312. It is evident from the FIG. 4 spot diagram that, when laser beam 170 propagates a significant distance 312 between surface 310S and workpiece 180, the one-dimensional focusing imparted by surface 310S results in a highly elliptical laser beam shape at workpiece 180. The beam spot is severely defocused in the x-dimension, with an aspect ratio of about 10:1 between the x- and z-dimensions. (Herein, aspect ratios are calculated based on the central 87% of the energy of laser beam 170.)

The defocusing and the resulting loss of intensity may be prohibitive for certain laser processing tasks. The defocusing issue can be overcome by configuring reflector 310 such that the distance 312 is too short for the one-dimensional focusing to have significant impact, as seen in the FIG. 5 spot diagram, but this solution has a significant drawback. In order to reasonably maintain focus at workpiece 180, distance 312 may need to be as short as about a millimeter or less. Such a short distance 312 puts surface 310S at high risk of being (a) damaged by the high intensity of laser beam 170 near its focus and (b) contaminated by material spattered from workpiece 180 when processed by laser beam 170.

In contrast, referring again to FIGS. 1 and 2, the present disclosure with bi-conical reflector system 110 provides a more attractive solution that is capable of irradiating workpiece 180 with a well-focused laser beam spot while maintaining a safe distance 212 between LOI 178 and surface 114S facing LOI 178. The inclusion of both a radially inward-facing conical mirror surface and a radially outward-facing conical mirror surface in bi-conical reflector system 110 reduces the asymmetry between the in-plane and out-of-plane transverse dimensions of laser beam 170 at workpiece 180. With laser beam 170 focused on workpiece 180, aspect ratios as small as about 2:1 between the out-of-plane and in-plane transverse dimensions may be achieved.

Bi-conical reflector system 110 is configured to direct laser beam 170 from surface 114S to workpiece 180 along a propagation path that is on the opposite side of reflector 112 from scanner 150. Laser beam 170 is incident on surface 112S from a space offset from surface 112S in the positive z-axis direction, but the propagation path of laser beam 170 from surface 114S to workpiece 180 passes through a space that is offset from surface 112S in the negative z-axis direction. Bi-conical reflector system 110 essentially directs laser beam 170 around reflector 112.

The axial extent of surface 112S spans between axial locations $z_1$ and $z_2$, and the axial extent of surface 114S spans between axial locations $z_3$ and $z_4$. The axial extents of surfaces 112S and 114S may overlap, such that at least a portion of reflector 112 is nested inside reflector 114. In most practical implementations, surface 114S extends further in the negative z-axis direction than surface 112S. The axial location of LOI 178 depends on a variety of factors, including offset p and the orientations and diameters of surfaces 112S and 114S. While many different configurations are possible, bi-conical reflector system 110 is best suited for irradiation of workpiece 180 with LOI 178 being axially offset from reflector 112 in the negative z-axis direction. In related embodiments, bi-conical reflector system 110 directs laser beam 170 from surface 114S toward workpiece 180 along a propagation direction that intersects center axis 190 outside the axial extent of reflector 112. Certain embodiments of bi-conical reflector system 110 direct laser beam 170 from surface 114S toward workpiece 180 along a propagation direction that intersects center axis 190 outside the axial extent of both of reflectors 112 and 114. Such embodiments have several advantages. For example, physical and visual access to LOI 178 benefits from LOI 178 being outside the axial extent of reflectors 112 and 114.

Apparatus 100 may include a camera 240 for inspecting the region of workpiece 180 near LOI 178. When LOI 178 is within the axial extent of bi-conical reflector system 110, as depicted in FIGS. 1 and 2, the viewing path 242 between camera 240 and LOI 178 is at an oblique angle to center axis 190. When LOI 178 is outside the axial extent of bi-conical reflector system 110, in the negative z-axis direction therefrom, viewing path 242 may be orthogonal to center axis 190. An orthogonal viewing path 242 is often advantageous, at least when the surface of workpiece 180 to be inspected is parallel to center axis 190. In such scenarios, image distortion is minimized when viewing path 242 is orthogonal to center axis 190.

The orientation of surface 112S is defined by an angle θ1, depicted in FIG. 2, with respect to a plane orthogonal to center axis 190. Angle θ1 is acute in order for surface 112S to reflect laser beam 170 radially outward. Correspondingly, the diameter of surface 112S increases in the negative z-axis direction. The orientation of surface 114S is defined by an angle $\theta_2$, depicted in FIG. 2, with respect to a plane orthogonal to center axis 190. Angle θ2 may be obtuse (as shown in FIG. 2), 90 degrees, or acute. When angle $\theta_2$ is 90 degrees, surface 114S is cylindrical. When angle $\theta_2$ is acute, the diameter of surface 114S increases in the negative z-axis direction. When angle $\theta_2$ is obtuse, the diameter of surface 114S decreases in the negative z-axis direction. As defined herein and as illustrated in FIG. 2, each of angles $\theta_1$ and $\theta_2$ opens in a direction that is radially inward and in the positive z-axis direction.

$\theta_2$ is greater than $\theta_1$ and less than $2\theta_1$. The lower limit $\theta_2>\theta_1$ ensures that surface 114S reflects laser beam 170 radially inward. ($\theta_2=\theta_1$ would cause laser beam 170 to propagate from surface 114S in a direction parallel to center axis 190 in the negative z-axis direction.) The upper limit $\theta_2<2\theta_1$ ensures that bi-conical reflector system 110 reflects laser beam 170 around reflector 112 rather than back across the propagation path from scanner 150 to surface 112S. ($\theta_2=2\theta_1$ would amount to surface 114S retroreflecting laser beam 170 back to LOI 176 on surface 112S.) Practical considerations will further limit the range of possible values of θ2. For example, the upper limit $\theta_2<2\theta_1$ is reduced at least by the transverse extent of laser beam 170 and likely also by the physical extent of reflector 112. The upper limit $\theta_2<2\theta_1$ is further reduced if it is required that LOI 178 is axially offset from reflector 112 in the negative z-axis direction, and even further reduced if LOI 178 is required to be axially offset from reflector 114 in the negative z-axis direction. The lower limit $\theta_2>\theta_1$ allows for LOI 178 to be at a very large negative axial offset from bi-conical reflector system 110, which is generally not desirable, and more practical implementations of apparatus 100 are therefore characterized by $\theta_2$ significantly exceeding $\theta_1$.

Further investigating the possible combinations of $\theta_1$ and $\theta_2$, one finds that $\theta_2$ must be acute unless $\theta_1$ exceeds 45 degrees. Consequently, in embodiments of apparatus 100 where surface 114S is cylindrical, or where the diameter of surface 114S increases in the negative z-axis direction, $\theta_1$ must exceed 45 degrees. The manufacturing of reflector 114 may be simpler when surface 114S is cylindrical.

Depending on the axial extent of workpiece 180 in relation to the portion of workpiece 180 to be laser processed, workpiece 180 may be situated inside one or both of reflectors 112 and 114. For example, a portion of workpiece 180 may extend all the way through reflectors 112 and 114, as shown in FIGS. 1 and 2. In this depicted scenario, the diameter 180D of workpiece 180 is limited by the smallest inner diameter of reflectors 112 and 114. In one implementation, the limiting diameter is the opening diameter 112D of the bore of reflector 112 closest to scanner 150. Thus, when designing a specific implementation of bi-conical reflector system 110, the dimensions of reflectors 112 and 114 may be adapted to accommodate workpieces 180 of a particular range of diameters 180D. In scenarios where workpiece 180 terminates at a location that is offset from $z_1$ in the negative z-axis direction, apparatus 100 may be able to accommodate workpieces 180 with larger diameters 180D.

Bi-conical reflector system 110 may be implemented on a wide range of size scales, for example to accommodate workpieces 180 of various sizes. In one implementation, the maximum diameter of surface 114S is in the range between 10 and 200 millimeters (mm), opening diameter 112D is in the range between 5 mm and 25.4 mm, and the axial extent of each of surfaces 112S and 114S is in the range between 5 and 100 mm.

Apparatus 100 may include one or more fixtures for holding workpiece 180 in place during processing by laser beam 170. In certain embodiments, apparatus 100 includes a fixture 220, depicted in FIG. 2, that accesses workpiece 180 from the side of bi-conical reflector system 110 that is opposite scanner 150, such that fixture 220 holds onto a portion of workpiece 180 that is axially offset from LOI 178 in the negative z-axis direction. Fixture 220 may be coupled to or include a motorized linear translation stage 222, or other motorized equipment, that translates workpiece 180 along center axis 190, as indicated by arrow 228. Such translation functionality allows laser beam 170 to process an axially extended region of workpiece 180. Translation stage 222 may be controlled by controller 162 and activated in conjunction with azimuthal scanning of laser beam 170, for example to cut or mark traces on workpiece 180 that are not orthogonal to center axis 190.

In another embodiment, apparatus 100 includes fixture 220 and a second fixture 230. Fixture 230 accesses workpiece 180 from the side of bi-conical reflector system 110 where scanner 150 is located, such that fixture 230 holds onto a portion of workpiece 180 that is axially offset from LOI 178 in the positive z-axis direction. Fixture 230 is useful when workpiece 180 includes two separate parts to be welded together by laser beam 170. In this scenario, one part is held by fixture 220 and the other is held by fixture 230. Fixture 230 may include a grip 232 and an arm 234 holding grip 232. When laser beam 170 is azimuthally scanned a full 360 degrees, laser beam 170 defines a cylindrical (virtual) volume that is parallel to and centered on center axis 190, extends axially from LOI 176 on surface 112S to scanner 150, and has a radius that equals offset p. When fixture 230 holds workpiece 180, fixture 230 reaches into this cylindrical volume and prevents full 360-degree azimuthal scanning of laser beam 170. Therefore, arm 234 may be a robotic arm operable to release grip 232 from workpiece 180 and remove fixture 230 from this cylindrical volume.

Figure 6:
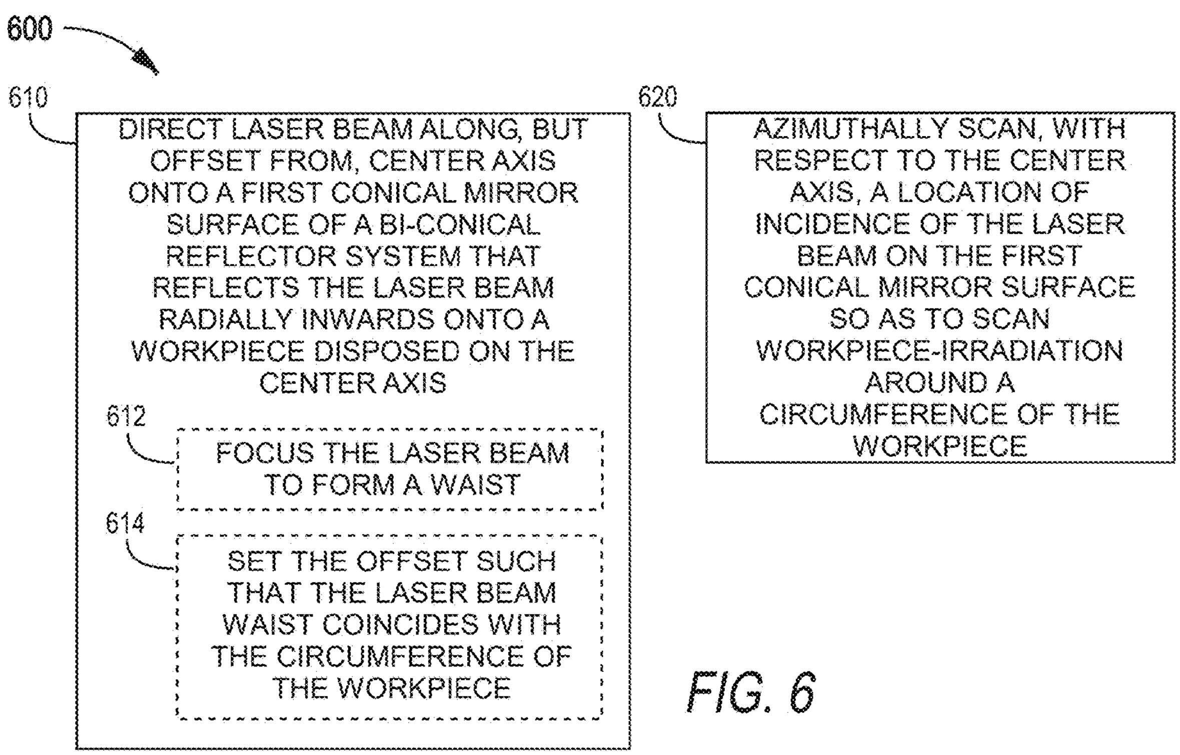
FIG. 6 is a flowchart for a method for radial laser processing of a workpiece, according to an embodiment.

FIG. 6 is a flowchart for one method 600 for radial laser processing of a workpiece. Method 600 may be performed by apparatus 100 to process workpiece 180, and is discussed as such in the following. Method 600 includes steps 610 and 620. In step 610, scanner 150 directs laser beam 170 along but offset from center axis 190 onto surface 112S of bi-conical reflector system 110 (as discussed above in reference to FIGS. 1 and 2), such that (a) surface 112S reflects laser beam 170 radially outwards and onto surface 114S and (b) surface 114S then reflects laser beam 170 radially inwards onto workpiece 180 disposed on center axis 190. Step 610 may be performed by mirror assembly 252 and focusing objective 254, as discussed above in reference to FIG. 2. In step 620, scanner 150 azimuthally scans, with respect to center axis 190, LOI 176 of laser beam 170 on surface 112S (as discussed above in reference to FIGS. 1 and 2), so as to scan irradiation of workpiece 180 around its circumference. Mirror assembly 252 may perform step 620 according to control signals received from controller 162.

In one embodiment, step 610 includes steps 612 and 614. In step 612, focusing objective 254 focuses laser beam 170 to form a beam waist therein, as discussed above in reference to FIG. 2. In step 614, mirror assembly 252 sets offset p such that the beam waist of laser beam 170 coincides with the circumference of workpiece 180. Mirror assembly 252 may perform step 614 according to control signals received from controller 162, as discussed above in reference to FIG. 2. Step 614 may benefit from angles $\theta_1$ and $\theta_2$ and the radial dimensions of surfaces 112S and 114S being selected such that the in-plane and out-of-plane transverse dimensions of laser beam 170 come to a focus at the same, or at least approximately the same, propagation distance from focusing objective 254.

Figure 7:
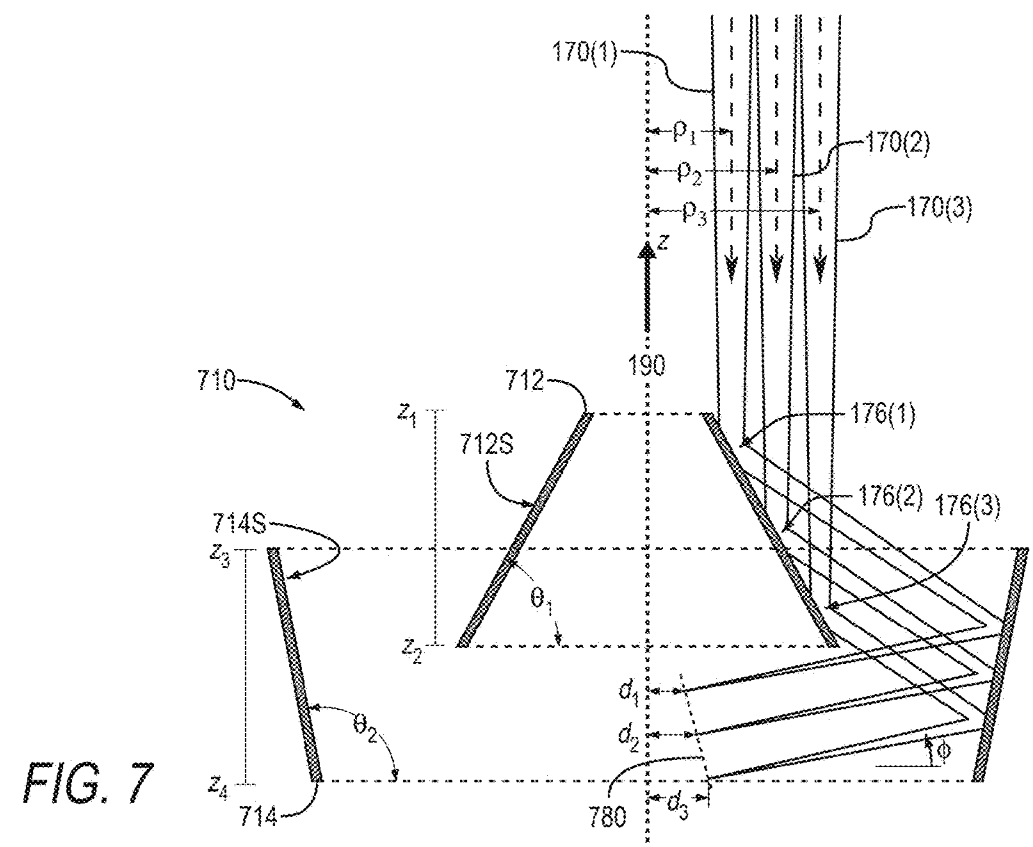
FIG. 7 is a diagram illustrating an example of adjustment of an offset between the laser beam and the center axis to focus the laser beam on the circumference of a workpiece of a certain diameter in the method of FIG. 6. The FIG. 7 diagram is based on an embodiment of the bi-conical reflector system of the apparatus of FIGS. 1 and 2, wherein the radially inward-facing conical mirror surface faces toward the laser beam scanner.

FIG. 7 is a diagram illustrating adjustment of offset p to focus laser beam 170 on the circumference of a workpiece of a certain diameter. FIG. 7 is a cross-sectional sideview of the propagation of a converging laser beam 170 through a bi-conical reflector system 710 for three different offset values $\rho_1$, $\rho_2$, and $\rho_3$. Bi-conical reflector system 710 is an embodiment of bi-conical reflector system 110 and implements reflectors 712 and 714 having conical mirror surfaces 712S and 714S, respectively. Bi-conical reflector system 710 is characterized by angle $\theta_2$ being obtuse, such that the diameter of surface 714S increases in the positive z-axis direction and surface 714S faces in the positive z-axis direction (and radially inward).

Each offset $\rho_1$, $\rho_2$, and $\rho_3$ corresponds to a respective LOI 176(1), 176(2), and 176(3) on surface 712S, for a respective instance 170(1), 170(2), and 170(3) of laser beam 170, as well as a respective location of incidence (not labeled in FIG. 7) on surface 714S. Line 780 indicates the location of the focus of laser beam 170 for different offsets p. With the specific choices of angles $\theta_1$ and $\theta_2$ depicted in FIG. 7, line 780 is at an oblique angle to center axis 190, and the radial distance d from center axis 190 to the focus of laser beam 170 is an increasing function of offset p. The radial distances $d_1$, $d_2$, and $d_3$ shown in FIG. 7 result from respective offsets $\rho_1$, $\rho_2$, and $\rho_3$.

Referring more generally to bi-conical reflector system 110, the relationship between radial distance d and offset p depends on the values of angles $\theta_1$ and $\theta_2$ (as well as the dimensions of surface 114S). For certain combinations of angles $\theta_1$ and $\theta_2$, the radial distance from center axis 190 to the focus of laser beam 170 is an increasing function of offset ρ, with the FIG. 7 configuration of bi-conical reflector system 710 being just one example hereof. For other combinations of angles $\theta_1$ and $\theta_2$, radial distance d is a decreasing function of offset p. There is even a more limited set of combinations of angles $\theta_1$ and $\theta_2$ that result in radial distance d being insensitive to offset ρ (for given radial dimensions of surface 114S). However, for the majority of configurations, radial distance d is sensitive to offset ρ, which enables adjustment of radial distance d through laser mirror assembly 252 changing offset ρ. In this manner, mirror assembly 252 can set offset ρ in step 614 of method 600 such that radial distance d coincides with the circumference 180C of workpiece 180, as long as diameter 180D of workpiece 180 is within an achievable range of radial distances d.

Figures 8, 9:
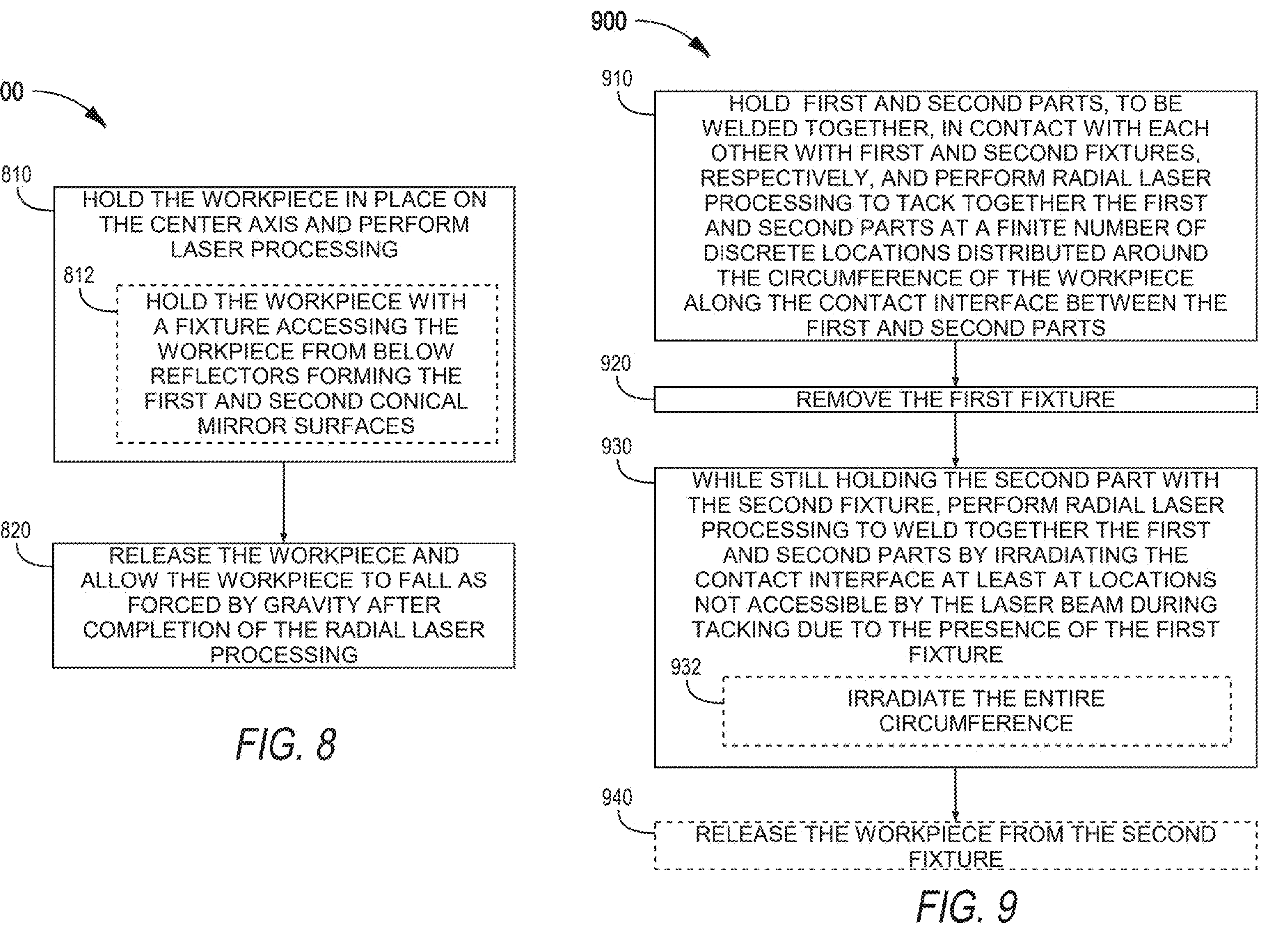
FIG. 8 is a flowchart for a radial laser processing method that utilizes gravitationally-mediated removal of the workpiece from the laser processing apparatus, according to an embodiment.
FIG. 9 is a flowchart for a radial laser processing method for welding together two parts, according to an embodiment.

FIG. 8 is a flowchart for one radial laser processing method 800 that utilizes gravitationally-mediated removal of the workpiece from the laser processing apparatus. Method 800 may be applied to workpiece 180 by an implementation of apparatus 100 that is oriented with (a) center axis 190 being at least nearly parallel to the gravitational force (center axis 190 being nearly vertical) and (b) bi-conical reflector system 110 disposed below scanner 150. In the following, method 800 is discussed in the context of such an implementation of apparatus 100.

Method 800 includes sequential steps 810 and 820. In step 810, apparatus 100 holds workpiece 180 in place on center axis 190 and performs radial laser processing on workpiece 180, as discussed above in reference to FIGS. 1, 2, and 6. Step 810 may include a step 812, wherein fixture 220 holds workpiece 180. With center axis 190 being vertical (at least to within, e.g., 10 degrees) and bi-conical reflector system 110 being disposed below scanner 150, fixture 220 accesses workpiece 180 from below reflectors 112 and 114. To avoid interfering with the propagation path of laser beam 170 from surface 114S to workpiece 180, fixture 220 holds onto a portion of workpiece 180 that is below LOI 178. In step 820, after completion of laser radial processing, apparatus 100 releases workpiece 180 and allows workpiece 180 to fall downwards as forced by gravity. When workpiece 180 is held by fixture 220 in step 810, fixture 220 releases workpiece 180 in step 820.

FIG. 9 is a flowchart for one radial laser processing method 900 for welding together two parts. Apparatus 100 may apply method 900 to an example of workpiece 180 that includes two initially separate parts to be laser welded together by laser beam 170. Method 900 may be performed by an embodiment of apparatus 100 that includes both of fixtures 220 and 230. In the following, method 900 is discussed in the context of such an embodiment of apparatus 100 in a scenario where workpiece 180 includes two rod-shaped parts that are stacked one-on-the-other with a common axis of rotational symmetry. For simplicity, it is assumed that the contact interface between the two parts is orthogonal to the symmetry axis. For visualization of an example, the workpiece 180 depicted in FIG. 2 may be viewed as two initially separate rod-shaped objects having a contact interface 288 that is orthogonal to center axis 190. One of the two parts extends from contact interface 288 in the positive z-axis direction, and the other one extends from contact interface 288 in the negative z-axis direction. Laser welding together two parts in apparatus 100 presents the challenge of holding both parts in place on center axis 190 without interfering with the propagation path of laser beam 170. Method 900 overcomes this challenge by first laser tacking together the two parts with partial welds and then relying on the structural stability provided by tacking to subsequently complete the laser welding process while holding onto only one of the parts.

In a step 910 of method 900, fixtures 220 and 230 hold together two respective parts on center axis 190 in apparatus 100. Apparatus 100 performs radial laser processing to tack together the two parts at a finite number of discrete locations distributed around the circumference of the workpiece along the contact interface, e.g., along contact interface 288 indicated in FIG. 2. The radial laser processing of step 910 may be performed in accordance with method 600 of FIG. 6. Since tacking does not require fully welding together the two parts, the azimuthal scanning of laser beam 170 in step 910 may be performed relatively quickly and with relatively gentle processing of workpiece 180, thus avoiding prolonged unbalanced forces that could cause either one of the two parts to twist away from center axis 190.

In a step 920, after the two parts have been secured to each other by tacking in step 910, fixture 230 releases workpiece 180 and is removed from the space between bi-conical reflector system 110 and scanner 150 where fixture 230 otherwise would interfere with a full 360-degree azimuthal scan of laser beam 170. This is discussed in further detail above in reference to FIG. 2.

In a step 930, performed while workpiece 180 is held only by fixture 220 and not by fixture 230, apparatus 100 performs radial laser processing to weld together the two parts of workpiece 180 by irradiating the contact interface, e.g., contact interface 288, at least at locations not accessible by laser beam 170 during step 910 due to the presence of fixture 230. Step 930 may include a step 932 of irradiating the contact interface around the entire circumference of workpiece 180. The radial laser processing of step 930 may be performed in accordance with method 600 of FIG. 6. The azimuthal scanning may be a continuous scan around the circumference of workpiece 180, and step 930 may utilize a higher laser beam power and a different scan rate than step 910 in order to fully weld, rather than tack, the two parts together.

After completion of the welding process in step 930, method 900 may include a step 940 of releasing workpiece 180 from fixture 220 to allow removal of workpiece 180 from apparatus 100.

Method 900 is a particularly advantageous application of apparatus 100. In a conventional laser welding apparatus, the two parts, to be welded together, would be physically rotated in a stationary laser beam. There is a substantial risk of loss of contact and/or alignment between the two parts during this rotation. Method 900 relies on azimuthal laser beam scanning and performs the welding operation with no need to physically rotate the parts to be welded.

The concepts and processes of methods 800 and 900 may be combined. For example, in one embodiment of method 800, step 810 includes performing steps 910, 920, and 930 of method 900, and step 820 includes performing step 940 of method 900.

Each of methods 800 and 900 may include axial translation of workpiece 180 during radial laser processing thereof. In one such example, method 800 is used to laser cut apertures in a tube-shaped workpiece 180, and axial translation of fixture 220 facilitates laser cutting of axially extended apertures. In another example, the contact interface between the two parts to be welded together in method 900 is not orthogonal to center axis 190. The contact interface may be in a plane that is at an oblique angle to center axis 190, or the contact interface may have a more complex, non-planar shape. Preferably, the portions of workpiece 180 irradiated in step 910 to tack together the two parts are located in a plane that is orthogonal to center axis 190, so as to avoid destabilizing the contact between the two parts before they are secured to each other by tacking.

Figures 10, 11, 12, 13:
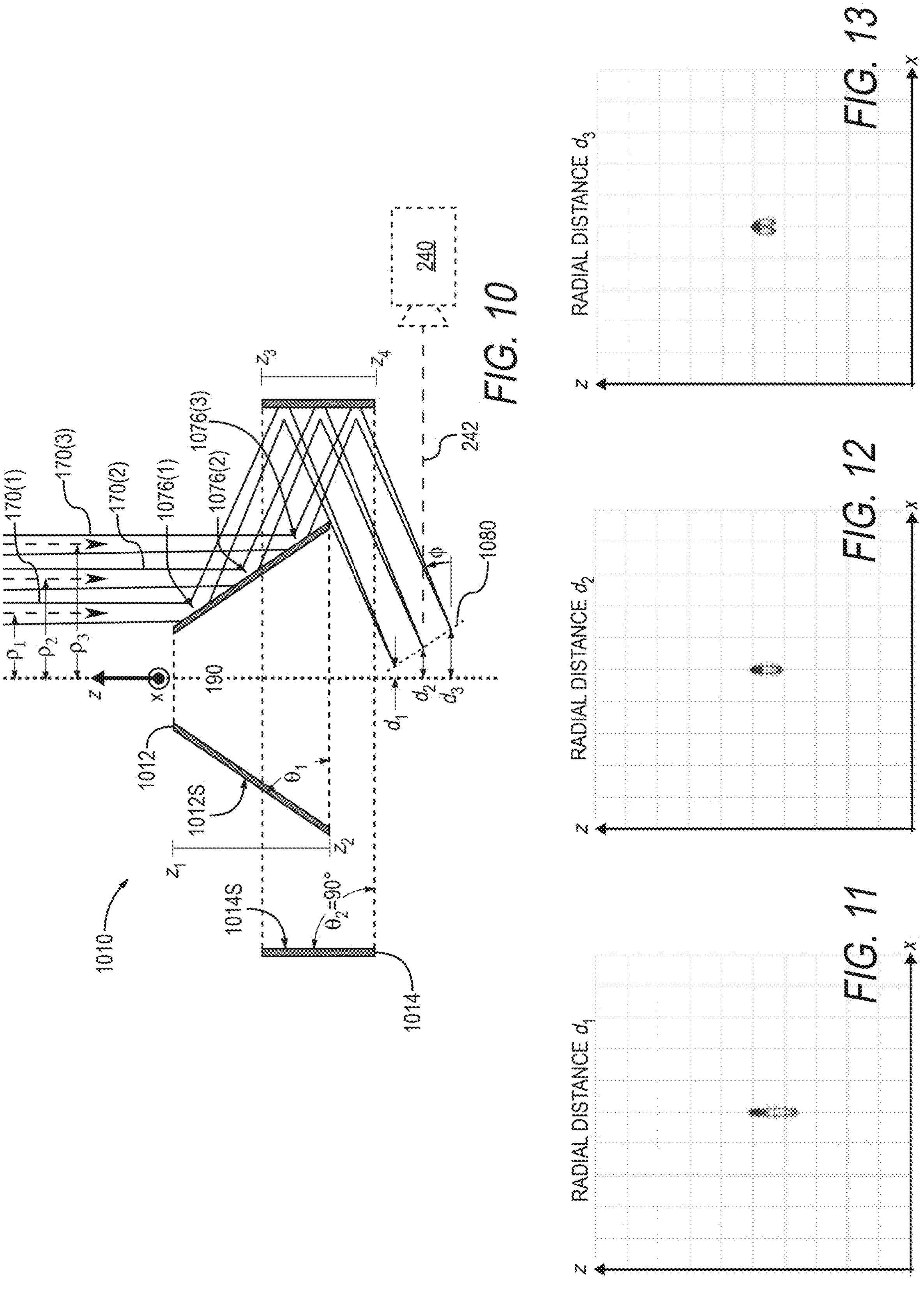
FIG. 10 is a cross-sectional sideview of a bi-conical reflector system that may be implemented in the apparatus of FIGS. 1 and 2, wherein the radially inward-facing mirror surface is cylindrical, according to an embodiment.
FIGS. 11, 12, and 13 are three respective example spot diagrams, similar to those of FIGS. 4 and 5, but pertaining to an embodiment of the apparatus of FIGS. 1 and 2 implementing the bi-conical reflector system of FIG. 10.

FIG. 10 is a cross-sectional sideview of one bi-conical reflector system 1010, wherein the radially inward-facing mirror surface is cylindrical. Bi-conical reflector system 1010 is an embodiment of bi-conical reflector system 110 and includes a reflector 1012 with a radially outward-facing mirror surface 1012S, and a reflector 1014 with a radially inward-facing mirror surface 1014S. Since $\theta_2$ is 90 degrees, $\theta_1$ exceeds 45 degrees.

In a manner similar to that used in FIG. 7, FIG. 10 shows the propagation of a converging laser beam 170 for three different values of offset ρ, as well as the corresponding radial distances d from center axis 190 to the focus of laser beam 170. Line 1080 indicates the location of the focus of laser beam 170 for different offsets p. It is evident that bi-conical reflector system 1010 allows for tuning of radial distance d by adjustment of offset ρ.

FIGS. 11, 12, and 13 are three respective spot diagrams, similar to those of FIGS. 5 and 6, but pertaining to an embodiment of apparatus 100 implementing bi-conical reflector system 1010. The spot diagrams are obtained for a specific example, wherein the diameter of surface 1014S is 54 mm and $\theta_1$ is 52 degrees. The spot diagrams of FIGS. 11, 12, and 13 illustrate laser beam 170 at its focus (with the focus of in-plane and out-of-plane transverse dimensions being co-localized) and resulting from respective offsets $\rho_1$, $\rho_2$, and $\rho_3$ (corresponding to respective incidence locations 1076(1), 1076(2), and 1076(3) on radially outward-facing mirror surface 1012S). The corresponding radial distances $d_1$, $d_2$, and $d_3$ are 1.7 mm, 3.4 mm, and 4.7 mm, respectively. Notably, the spot size remains fairly small in the x-dimension for all three radial distances. The aspect ratio between the x- and z-dimensions decreases with radial distance d and is less than 4:1 for each of radial distances $d_1$, $d_2$, and $d_3$, and only 2:1 for radial distance $d_3$. These aspect ratios represent a significant improvement over single conical reflector 310. The dual reflections of laser beam 170 in bi-conical reflector system 1010 do introduce coma, which is visible in the spot diagrams as the aberrated outer contour of spots. However, this outer contour of spots represents only 17 percent of the laser beam energy while the vast majority of the laser beam power remains relatively undistorted. Furthermore, the aberrations visible in FIGS. 11, 12, and 13 may be further reduced by reducing the diameter of laser beam 170. An optimal laser beam diameter may be derived from an analysis of (a) the laser power needed at workpiece 180 for the intended form of laser processing, and (b) the laser-induced-damage thresholds of surfaces 1012S and 1014S.

In the specific example of bi-conical reflector system 1010 depicted in FIG. 10, the focus of laser beam 170 is outside the axial extent of reflectors 1012 and 1014.

Assuming that LOI 178 coincides with the laser beam focus, LOI 178 is thus outside the axial extent of reflectors 1012 and 1014. This advantageously allows for camera 240 to view LOI 178 along a viewing path 242 that is orthogonal to center axis 190. In other examples of bi-conical reflector system 1010, LOI 178 may be within the axial extent of reflector 1014, but LOI 178 is always offset from the axial extent of reflector 1012 in the negative z-axis direction because surface 1014S is cylindrical.

FIG. 10 further shows an attack angle ϕ, the angle by which the propagation direction of laser beam 170 toward workpiece 180 deviates from being orthogonal to center axis 190. With the cylindrical shape of surface 1014S, attack angle ϕ equals $2\theta_1$-90°. A zero-degree attack angle ϕ is therefore not achievable with bi-conical reflector system 1010. In certain embodiments, attack angle ø exceeds 15 degrees and is, for example, in the range between 15 and 30 degrees. A non-zero attack angle ø is advantageous in some scenarios, for example when the diameter 180D of workpiece 180 changes in the region near LOI 178, such as when a smaller-diameter part is to be welded to a larger-diameter part. In such scenarios, the non-zero attack angle ø may be a better fit for the topology of workpiece 180 than a zero-degree attack angle $\phi$.

Referring again to bi-conical reflector system 710 of FIG. 7, an attack angle $\phi$ of smaller magnitude may be achieved with the obtuse angle $\theta_2$ of surface 714S. For all embodiments of bi-conical reflector system 110 in apparatus 100, whether $\theta_2$ is obtuse, acute, or 90 degrees, the attack angle may be expressed as $\phi=2\theta_1-2\theta_2+90°=2(\theta_1-45°)+2(90°-\theta_2)$. (In the context of bi-conical reflector system 110, a positive value of $\phi$ corresponds to the axial component of the propagation direction of laser beam 170 toward workpiece 180 being in the negative z-axis direction, and a negative value of $\phi$ corresponds to the axial component of the propagation direction of laser beam 170 toward workpiece 180 being in the positive z-axis direction.) Thus, for the same value of $\theta_1$, the obtuse angle $\theta_2$ in bi-conical reflector system 710 causes the magnitude of attack angle $\phi$ to be less than that achieved with bi-conical reflector system 1010, which may be preferred in some scenarios. For example, a near-zero-degree attack angle may be preferred when the surface of workpiece 180 in the region near LOI 178 is parallel to center axis 190. A zero-degree attack angle ø may be achieved with bi-conical reflector system 710, provided that $\theta_1$ exceeds 45 degrees. For example, $\phi=0$ when $\theta_1=60°$ and $\theta_2=105°$.

Figure 14:
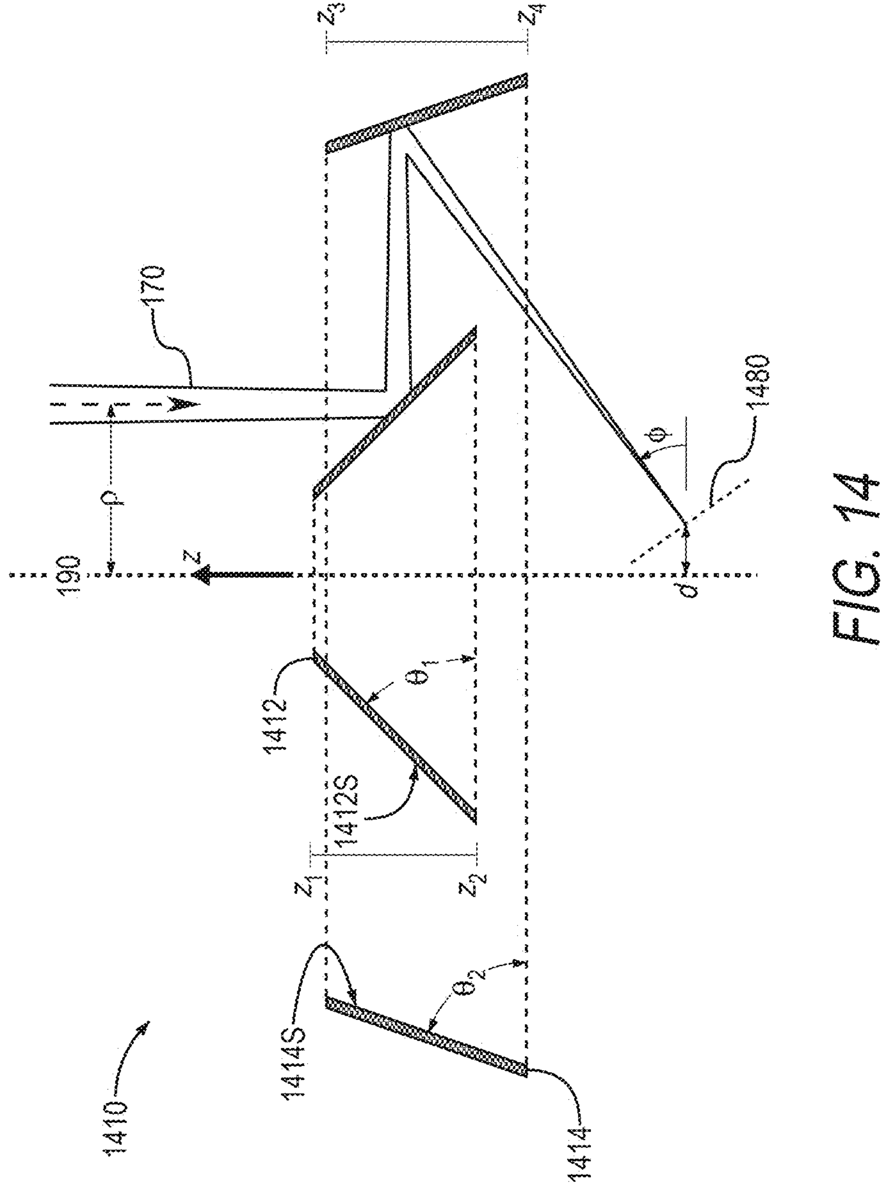
FIG. 14 illustrates a bi-conical reflector system that may be implemented in the apparatus of FIGS. 1 and 2, wherein the radially inward-facing mirror surface faces away from the laser beam scanner, according to an embodiment.

FIG. 14 is a cross-sectional sideview of one bi-conical reflector system 1410 that is an embodiment of bi-conical reflector system 110, wherein the radially inward-facing mirror surface faces away from scanner 150. Bi-conical reflector system 1410 includes a reflector 1412 with a radially outward facing mirror surface 1412S, and a reflector 1414 with a radially inward-facing mirror surface 1414S. The diameter of surface 1414S decreases in the positive z-axis direction, and surface 1414S faces radially inward and in the negative z-axis direction. Angle $\theta_1$ of surface 1414S may exceed, equal, or be less than 45 degrees. $\theta_2$ is acute.

As compared to bi-conical reflector system 1010, which has a cylindrical radially inward-facing surface, bi-conical reflector system 1410 is more naturally suited for scenarios where a greater attack angle $\phi$ is desired. For the same value of $\theta_1$, the acute angle $\theta_2$ in bi-conical reflector system 1410 causes the magnitude of attack angle § to exceed that achieved with bi-conical reflector system 1010. Bi-conical reflector system 1410 also allows for the laser beam focus and LOI 178 being located outside the axial extent of reflectors 1412 and 1414, providing the associated benefits discussed above for the bi-conical reflector system 1010.

Line 1480 indicates radial distance d as a function of offset $\rho$. In bi-conical reflector system 1410, line 1480 is at an oblique angle to center axis 190. Hence, radial distance d may be tuned by adjusting offset $\rho$.

Referring more generally to bi-conical reflector system 110 and apparatus 100, laser beam 170 is most easily directed around reflector 112 when $\theta_1$ exceeds 45 degrees. Thus, certain embodiments are characterized by $\theta_1$ being greater than 45 degrees, for example with $\theta_1$ being greater than 45 degrees and less than 65 degrees, while $\theta_2$ is acute, 90 degrees, or obtuse. In one such embodiment, $\theta_1$ and $\theta_2$ are such that the axial component of the propagation direction of laser beam 170 is in the negative z-axis direction both between surfaces 112S and 114S and from surface 114S toward center axis 190.

Figure 15:
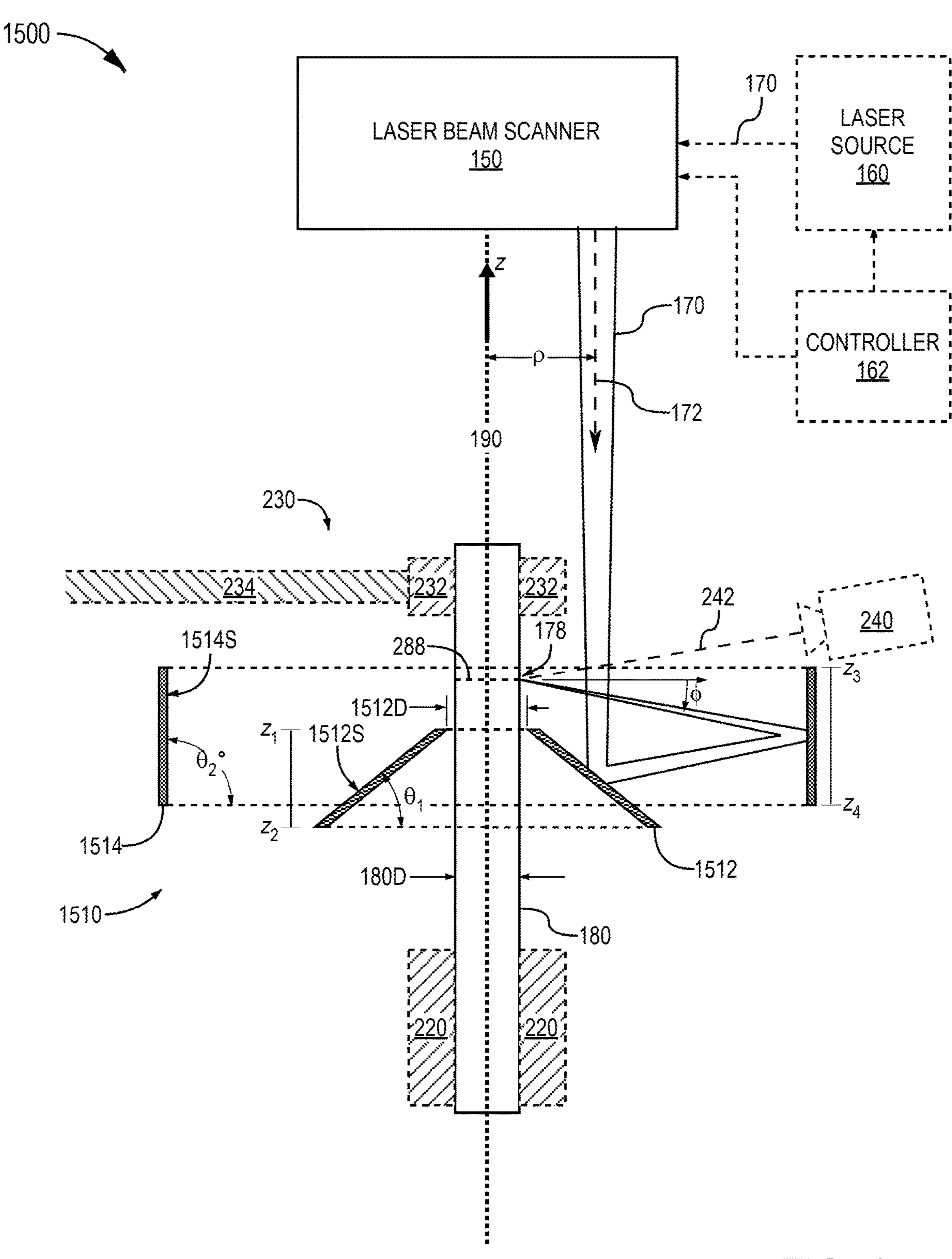
FIG. 15 illustrates another apparatus for radial laser processing of a workpiece, located on a center axis, utilizing a laser beam scanner and a bi-conical reflector system to direct the laser beam to the workpiece and azimuthally scan the direction from which the laser beam is incident on the workpiece, according to an embodiment.

FIG. 15 illustrates another apparatus 1500 for radial laser processing of a workpiece 180 utilizing a bi-conical reflector system. FIG. 15 depicts apparatus 1500 in a cross-sectional sideview similar to that used in FIG. 2 for apparatus 100. Apparatus 1500 may be viewed as a modification of apparatus 100, and may perform any one of methods 600, 800, and 900. As compared to apparatus 100, bi-conical reflector system 110 is replaced by a bi-conical reflector system 1510 that includes a reflector 1512 with a radially outward-facing mirror surface 1512S, and a reflector 1514 with a radially inward-facing mirror surface 1514S.

Whereas surfaces 112S and 114S of bi-conical reflector system 110 cooperate to direct laser beam 170 around reflector 112, surface 1514S of bi-conical reflector system 1510 directs laser beam 170 back across its initial propagation path from scanner 150 to surface 1512S. Apparatus 1500 is thus best suited for irradiation of workpiece 180 at a location that is between scanner 150 and reflector 1512 (although irradiation of workpiece 180 at other axial locations is possible with some embodiments of bi-conical reflector system 1510).

Apparatus 1500 may include camera 240, with viewing path 242 passing between scanner 150 and bi-conical reflector system 1510. In the scenario depicted in FIG. 15, LOI 178 is within the axial extent of bi-conical reflector system 1510 and viewing path 242 is therefore at an oblique angle to center axis 190. In scenarios where LOI 178 is outside the axial extent of bi-conical reflector system 1510, viewing path 242 may be orthogonal to center axis 190.

In bi-conical reflector system 1510, $\theta_2$ exceeds $2\theta_1$ and is less than $90°+\theta_1$. In the embodiment depicted in FIG. 15, surface 1514S is cylindrical, that is, characterized by $\theta_2$ being 90 degrees. In other embodiments of bi-conical reflector system 1510, $\theta_2$ is acute such that surface 1514S faces radially inward and in the negative z-axis direction, or obtuse, such that surface 1514S faces radially inward and in the positive z-axis direction. In embodiments of apparatus 1500 where surface 1514S is cylindrical, or its diameter increases in the negative z-axis direction (i.e., surface 1514S facing in the negative z-axis direction away from scanner 150, and $\theta_2$ being acute), $\theta_1$ must be less 45 degrees. On the other hand, $\theta_1$ may be 45 degrees or more when the diameter of surface 1514S increases in the positive z-axis direction (i.e., surface 1514S facing in the positive z-axis direction toward scanner 150, and $\theta_2$ being obtuse).

In certain embodiments of bi-conical reflector system 1510, $\theta_1<45°$, for example less than 45 degrees and greater than 15 degrees. This is a relatively simple way to facilitate LOI 178 being outside the axial extent of reflector 1512 even for a range of values of $\theta_2$. In one such embodiment, $\theta_1$ and $\theta_2$ are such that the axial component of the propagation direction of laser beam 170 is in the positive z-axis direction both between surfaces 1512S and 1514S and from surface 1514S toward center axis 190. Additionally, $\theta_1<45°$ easily facilitates a near-zero attack angle ¢ when $\theta_2$ is acute.

With bi-conical reflector system 1510, the attack angle can be expressed as $\phi=2\theta_2-2\theta_1-90°=2(\theta_2-90°)+2(45°-\theta_1)$. (In the context of bi-conical reflector system 1510, a positive value of $\phi$ corresponds to the axial component of the propagation direction of laser beam 170 toward workpiece 180 being in the positive z-axis direction, and a negative value of $\phi$ corresponds to the axial component of the propagation direction of laser beam 170 toward workpiece 180 being in the negative z-axis direction.) Angles $\theta_1$ and $\theta_2$ may be selected to achieve a desired attack angle $\phi$ and/or a desired location of LOI 178. The relationships between (a) attack angle $\phi$ and the location of LOI 178 and (b) angles $\theta_1$ and $\theta_2$ may be determined in manner similar to that discussed above in reference to bi-conical reflector systems 110, 710, 1010, and 1410, with proper adaptation to the laser beam propagation scheme in bi-conical reflector system 1510.

For most embodiments of apparatus 1500, when laser beam 170 is converging, radial distance d between the focus of laser beam 170 and center axis 190 is sensitive to offset ρ. In many practical implementations, radial distance d is an increasing function of offset ρ.

In the embodiment depicted in FIG. 15, the axial extent of surface 1514S (between $z_3$ and $z_4$) overlaps with the axial extent of surface 1512S (between $z_1$ and $z_2$). In other embodiments, the overlap may be different from that depicted in FIG. 15, or there may be no overlap.

In most scenarios, LOI 178 is offset from reflector 1512 in the positive z-axis direction and workpiece 180 is held by a fixture that reaches workpiece 180 from a space offset from reflector 1512 in the negative z-axis direction. Workpiece 180 therefore extends through the opening of the bore of reflector 1512 nearest scanner 150, and diameter 180D of workpiece 180 is at least locally limited by the minimum diameter 1512D of the bore of reflector 1512. In one scenario, diameter 180D is less than diameter 1512D from the end of workpiece 180 nearest scanner 150 at least to a location on workpiece 180 that is inside reflector 1512.

Figures 16, 17:
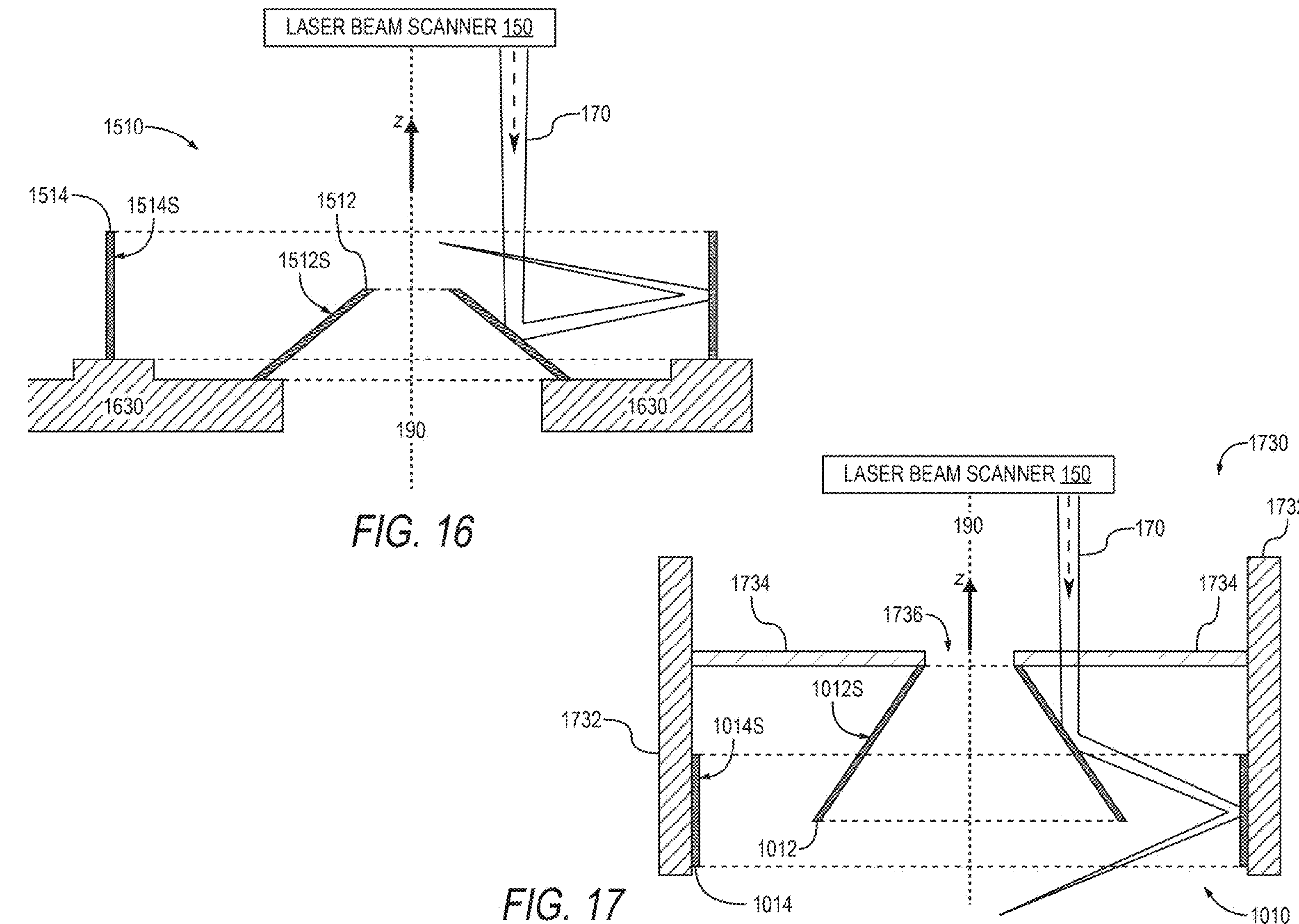
FIG. 16 illustrates a scheme for mounting the bi-conical reflector system in the apparatus of FIG. 15, according to an embodiment.
FIG. 17 illustrates an assembly for mounting the bi-conical reflector system in the apparatus of FIGS. 1 and 2, according to an embodiment.

FIG. 16 illustrates, in cross-sectional sideview, one scheme for mounting reflectors 1512 and 1514 of bi-conical reflector system 1510 in apparatus 1500, wherein reflectors 1512 and 1514 are coupled to a common support 1630 disposed on the opposite side of bi-conical reflector system 1510 from scanner 150. Support 1630 contacts portions of reflectors 1512 and 1514 that are offset, in the negative z-axis direction from the propagation path of laser beam 170, such that support 1630 does not interfere with the propagation of laser beam 170 regardless of the azimuthal location thereof. In certain implementations, support 1630 is coupled to scanner 150, either directly or through a common fixture. Support 1630 may be made of metal.

FIG. 17 illustrates, in cross-sectional sideview, an assembly 1730 for mounting reflectors 1012 and 1014 of bi-conical reflector system 1010 in apparatus 100, wherein reflector 1012 is suspended from a plate intersecting the propagation path of laser beam 170 from scanner 150 to surface 1012S. Since bi-conical reflector system 1010 directs laser beam 170 around reflector 1012, implementation of a support similar to support 1630 would interfere with laser beam 170. To overcome this issue, assembly 1730 includes (a) an outer mount 1732 that holds reflector 1014 and (b) a plate 1734 that suspends reflector 1012 from outer mount 1732. Plate 1734 is coupled to a portion of reflector 1012 nearest scanner 150, such that plate 1734 intersects laser beam 170 before laser beam 170 is reflected by surface 1012S. At least an annular segment of plate 1734, surrounding center axis 190, is transmissive to laser beam 170, such that a full 360-degree azimuthal scan may be performed without laser beam 170 being blocked by plate 1734. Plate 1734 may be made of glass, e.g., fused silica.

Plate 1734 may have an aperture 1736 at center axis 190, for example of approximately the same size as the opening of reflector 1012 facing scanner 150, to allow workpiece 180 to extend beyond plate 1734 in the direction toward scanner 150. The positioning of plate 1734 on the side of reflector 1012 nearest scanner 150 has several advantages including (a) laser beam 170 being incident on plate 1734 at normal incidence, and (b) minimized risk of contamination of plate 1734 by any material spattered from laser processing of workpiece 180. Outer mount 1732 may be made of metal. In certain implementations, outer mount 1732 is coupled to scanner 150, either directly or through a common fixture.

Either one of bi-conical reflector systems 710 and 1410 may be mounted in apparatus 100 using an assembly similar to assembly 1730. If needed, the shape of outer mount 1732 may be adapted to interface with reflector 714/1414.

Either one of apparatus 100 and apparatus 1500 may further be configured to conduct a gas flow along center axis 190 through the bi-conical reflector system to aid laser processing. For example, outer mount 1732 may serve as a conduit for such a gas flow, with plate 1734 causing the gas flow to pass through reflector 1012 via aperture 1736.

The present disclosure is described above in terms of a preferred embodiment and other embodiments. The invention is not limited, however, to the embodiments described and depicted herein. Rather, the invention is limited only by the claims appended hereto.

What is claimed is:

1. An apparatus for radial laser processing of a workpiece located on a center axis, comprising:

a laser beam scanner for directing a laser beam along but offset from the center axis; and a bi-conical reflector system including:

a first conical mirror surface arranged to receive the laser beam from the laser beam scanner, wherein the first conical mirror surface surrounds the center axis, is non-cylindrical and rotationally symmetric about the center axis, and faces away from the center axis to reflect the laser beam radially outwards therefrom, and a second conical mirror surface arranged to receive the laser beam from the first conical mirror surface, wherein the second conical mirror surface surrounds the center axis, is rotationally symmetric about the center axis, and faces the center axis so as to reflect the laser beam radially inwards toward the center axis;

wherein:

the laser beam scanner is configured to azimuthally, with respect to the center axis, scan a location of incidence of the laser beam on the first conical mirror surface to scan an azimuthal angle of propagation of the laser beam from the second conical mirror surface toward the center axis, an axial component, parallel to the center axis, of an initial propagation direction of the laser beam from the laser beam scanner toward the bi-conical reflector system is in a first axial direction, and the first and second conical mirror surfaces are at first and second angles to a plane orthogonal to the center axis, each of the first and second angles opening in a direction that is radially inward and axially opposite the first axial direction, the first angle being acute, the second angle being greater than the first angle and smaller than twice the first angle.

2. The apparatus of claim 1, wherein the first angle is less than 45 degrees.

3. The apparatus of claim 2, wherein the second conical mirror surface is cylindrical.

4. The apparatus of claim 2, wherein a diameter of the second conical mirror surface increases in the first axial direction.

5. The apparatus of claim 2, wherein, when the initial propagation direction is parallel to the center axis, the first and second angles are configured to cause an axial component of a propagation direction of the laser beam from the second conical mirror surface toward the center axis to be in the first axial direction.

6. The apparatus of claim 1, wherein the first and second angles are configured to cause a propagation direction of the laser beam from the second conical mirror surface toward the center axis to intersect the center axis at a location that is offset in the first axial direction from a reflector forming the first conical mirror surface.

7. The apparatus of claim 1, further comprising: an outer mount holding a second conical reflector forming the second conical mirror surface; and a plate suspending a first conical reflector, forming the first conical mirror surface, from the outer mount, the plate intersecting an initial propagation path of the laser beam from the laser beam scanner to the first conical mirror surface, wherein at least an annular segment of the plate, surrounding the center axis, is transmissive to the laser beam.

8. An apparatus for radial laser processing of a workpiece located on a center axis, comprising:

- a laser beam scanner for directing a laser beam along but offset from the center axis; and a bi-conical reflector system including:
  - a first conical mirror surface arranged to receive the laser beam from the laser beam scanner, wherein the first conical mirror surface surrounds the center axis, is non-cylindrical and rotationally symmetric about the center axis, and faces away from the center axis to reflect the laser beam radially outwards therefrom, and
  - a second conical mirror surface arranged to receive the laser beam from the first conical mirror surface, wherein the second conical mirror surface surrounds the center axis, is rotationally symmetric about the center axis, and faces the center axis so as to reflect the laser beam radially inwards toward the center axis;

wherein:

- the laser beam scanner is configured to azimuthally, with respect to the center axis, scan a location of incidence of the laser beam on the first conical mirror surface to scan an azimuthal angle of propagation of the laser beam from the second conical mirror surface toward the center axis,
- an axial component, parallel to the center axis, of an initial propagation direction of the laser beam from the laser beam scanner toward the bi-conical reflector system is in a first axial direction, and
- the first and second conical mirror surfaces are at first and second angles to a plane orthogonal to the center axis, each of the first and second angles opening in a direction that is radially inward and axially opposite the first axial direction, the first angle being acute, the second angle being greater than twice the first angle and less than the first angle plus 90 degrees.

9. The apparatus of claim 8, wherein the first angle is less than 45 degrees.

10. The apparatus of claim 9, wherein the second conical mirror surface is cylindrical.

11. The apparatus of claim 9, wherein a diameter of the second conical mirror surface increases in the first axial direction.

* * * * *